United States Patent
Brown et al.

(10) Patent No.: US 6,563,420 B2
(45) Date of Patent: May 13, 2003

(54) POWER LINE COMMUNICATIONS APPARATUS AND METHOD

(75) Inventors: Scott R. Brown, Wake Forest, NC (US); Gary W. Scott, Mount Vernon, IA (US)

(73) Assignee: Square D Company, Palatine, IL (US)

( * ) Notice: Subject to any disclaimer, the term of this patent is extended or adjusted under 35 U.S.C. 154(b) by 0 days.

(21) Appl. No.: 09/951,604

(22) Filed: Sep. 13, 2001

(65) Prior Publication Data

US 2003/0048152 A1 Mar. 13, 2003

(51) Int. Cl.[7] .............................................. H04M 11/04
(52) U.S. Cl. ........................... 340/310.01; 340/310.05; 340/310.07; 333/137; 333/136; 333/119; 333/100; 333/24 R
(58) Field of Search ............................. 333/24 R, 100, 333/119, 131, 136; 336/173, 229; 340/310.01, 310.05, 310.07

(56) References Cited

U.S. PATENT DOCUMENTS

| | | | |
|---|---|---|---|
| 4,686,382 A | * 8/1987 | Shuey | 307/149 |
| 4,862,157 A | * 8/1989 | Noel | 307/38 |
| 5,148,144 A | * 9/1992 | Sutterlin et al. | 340/310.01 |
| 5,210,519 A | * 5/1993 | Moore | 340/310.06 |
| 5,554,968 A | * 9/1996 | Lee | 340/310.01 |
| 5,770,996 A | * 6/1998 | Severson et al. | 307/127 |

* cited by examiner

Primary Examiner—Michael Tokar
Assistant Examiner—Nguyen Khai
(74) Attorney, Agent, or Firm—David R. Stacey; Larry T. Shrout; Larry I. Golden

(57) ABSTRACT

A power line communications apparatus and method for providing communications over power leads connecting two pieces of electrical equipment. One power lead is split into similarly sized first and second parallel conductors. The first and second conductors pass through a current transformer, the first conductor having a load current flow opposite the second conductor with respect to the current transformer. The transmitted communications signal is applied to the secondary of the current transformer and is induced on the primary of the transformer, namely a loop formed by the first and second conductors. A second current transformer serves as a receiving transducer and senses the communications signal on the first and second conductors.

21 Claims, 4 Drawing Sheets

POWER LINE COMMUNICATIONS APPARATUS AND METHOD

FIELD OF THE INVENTION

This invention pertains to an apparatus and method for point-to point communicating over electrical power line cables. More particularly, this invention pertains to an apparatus and a method of communicating by inductive coupling to a single power-line lead that includes two parallel conductors.

DESCRIPTION OF THE RELATED ART

Electrical equipment requires power lines for supplying either direct current or alternating current. Power line connections, or power leads, to electrical equipment generally include two or more power leads and may include a ground lead. For direct current power equipment, the two power leads are the positive and negative leads and optionally, a ground lead. Single phase alternating current equipment power leads include a phase lead, a neutral lead and optionally, a ground lead. For multi-phase power equipment, the power leads include a lead for each phase, and optionally, a neutral lead and/or a ground lead.

In industrial settings, it is often a requirement to control or operate motors locally, that is, at the motor location. Also, indication of equipment status or other information is often required locally. However, the controller for the electrical equipment, such as the equipment that switches the power to the motor, is typically located remotely, that is, at a location some distance away from the motor location. Communication of control and indication signals between motor drive controllers and the driven motor has traditionally been done through additional cables and wiring separate from the power leads. The use of dedicated control and indication wiring increases the installation cost of motor driven systems. Power line communication systems have been developed using capacitive coupling for connecting to the power lines. However, these systems have electrical isolation and noise issues.

BRIEF SUMMARY OF THE INVENTION

According to one embodiment of the present invention, an apparatus and method for a power line communications system is provided. The power line communications system does not require dedicated communications or control wiring; instead the system utilizes the electrical power leads connecting two electrical devices.

The communications signal in this system is inductively coupled to one of the power leads. The one power lead is wired with two parallel conductors; that is, the single lead is split into two similarly sized conductors, each carrying approximately half the load current of that power lead. The two parallel conductors are coupled to a plurality of current transformers; each current transformer is located at a point where communications are desired to be received or transmitted. Each of the two conductors is passed, in opposite directions, through the center opening of each current transformer. That is, the direction of current flowing in one of the two conductors is opposite that of the other of the two conductors, relative to the current transformer. Because the similarly sized conductors are carrying the same load current, the current transformers see a net load current of zero.

The two conductors form a loop and serve as the primary winding for the current transformer. The communications signal is applied to the secondary winding of one current transformer, which induces a signal on the primary winding. The induced signal from the transmitting current transformer is sensed by the receiving current transformer.

The method for power line communications includes the steps of forming a loop from one of the power leads connecting two pieces of electrical equipment, inductively inducing a communications signal on that loop at a first point, and sensing the induced signal on the loop at a second point. Additionally, the method includes the steps of converting control and other signals into a communications signal and converting the communications signal into control and other signals.

BRIEF DESCRIPTION OF THE DRAWINGS

The above-mentioned features of the invention will become more clearly understood from the following detailed description of the invention read together with the drawings in which.

DETAILED DESCRIPTION OF THE DRAWINGS

Figure 1:
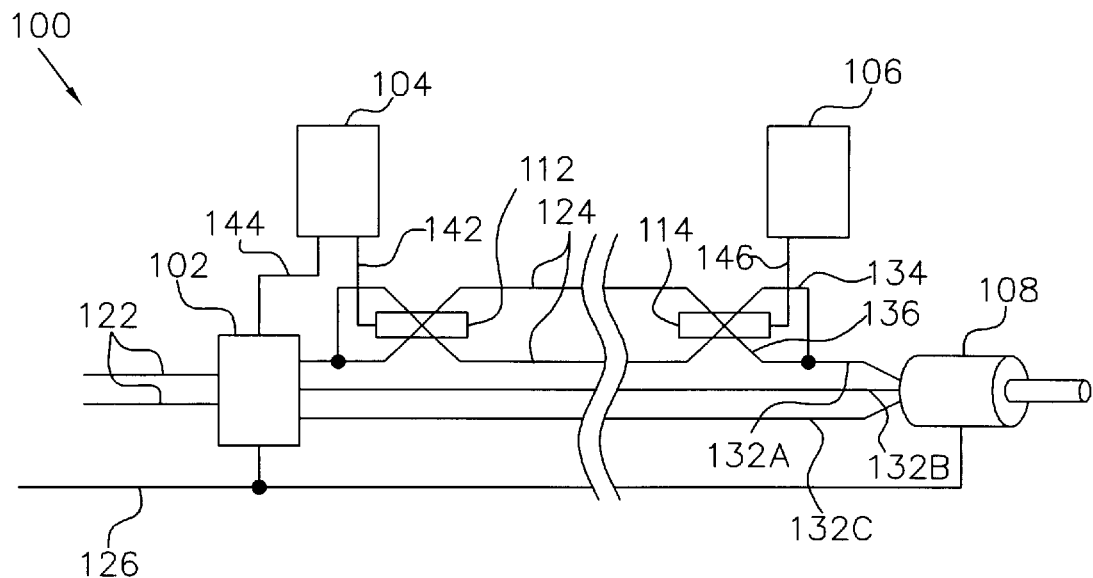
FIG. 1 is a schematic diagram of a motor drive, a motor, and a power line communications system.

An apparatus and method for communicating over electrical power lines is disclosed. FIG. 1 is a schematic diagram generally illustrating a power line communications system generally indicated by reference numeral 100. In one embodiment, the power line communications system 100 includes a remote transceiver 104 and associated current transformer 112 located at the motor drive controller 102 (first point) and a local transceiver 106 and associated current transformer 114 located at the motor 108 (second point). In the illustrated embodiment, the motor 108 is a 3-phase variable speed motor controlled by a single-phase motor drive controller 102. The remote transceiver 104 receives and decodes the control signals sent from the local transceiver 106, generates control signals, and operates the remote indicators, such as speed indicators and motor direction indicating lamps. The generated control signals are sent to the motor drive controller 102, which controls the electrical power to the motor 108. The remote transceiver 104 also receives status and indication signals from the motor drive controller 102 and transmits associated signals to the local transceiver 106. The local transceiver 106 includes local control switches, such as can be used to control motor direction and speed, and local indicators, such as speed indicators and motor direction indicating lamps. The local control switches create control signals, which are transmitted to the remote transceiver 104. The indicators operate in accordance with communication signals sent by the remote transceiver 102.

In another embodiment, a receiver 104 located near the motor drive controller 102 receives signals from the transmitter 106 located near the motor 108. The receiver 104 includes circuitry that decodes the communication signals from the transmitter 106 and provides control signals to the motor drive controller 102. The transmitter 106 includes local control switches for operating the motor 108. In this embodiment, local indication is not required or necessary; therefore, communications signals need travel only in one direction, from the local motor control station to the motor drive controller 102, and the communications signals include switch positions and other control signals.

Although motor controllers 102 and motors 108 are illustrated and discussed, the present invention is not limited to such electrical equipment. Those skilled in the art will recognize that the present invention applies to any type of electrical equipment located at a first point and electrically connected to a second electrical equipment located at a second point by power leads such as 132A, 132B and 132C. The communication signals can be directly related to the function of one of the electrical equipment, or the communication signals can be unrelated, such as voice communications having at least one terminal point near the electrical equipment.

Referring to FIG. 1, one power lead 132A of an electrical power system 122 is split into first and second parallel conductors, 134 and 136, respectively, with each conductor passing through the current transformers 112, 114. The first and second parallel conductors 134 and 136, are similarly sized and carry approximately one-half the total load current $I_{LOAD}$ for that power lead 132A. Those skilled in the art will recognize that the present invention is not limited to applications using three-phase power systems. In one embodiment, the power lead 132A is either the phase conductor or the neutral conductor of a single-phase power system. In another embodiment, the power lead 132A is either the positive or negative conductor of a direct current power system. Those skilled in the art will recognize that the power line communications system 100 of the present invention is not limited to any one of the power leads 132A, 132B, or 132C, but can also include the neutral lead (not illustrated) or an insulated ground lead 126. Also, those skilled in the art will recognize that more than one of the power leads 132A, 132B or 132C can incorporate the power line communications system 100 of the present invention simultaneously.

The first and second conductors 134, 136 form a loop 124 of wire that acts as a communications link. The first and second conductors 134 and 136 are passed through the center of the current transformers 112 and 114 such that load current I1 flowing in the first conductor 134 opposes load current I2 flowing in the second conductor 136 as it passes through the current transformers 112 and 114. This is accomplished by crossing the first and second conductors 134 and 136 as they pass through the current transformers 112 and 114, or applying an equal number of multiple turns of the first and second conductors 134 and 136 in opposite directions with respect to current transformers 112 and 114, thereby causing a net load current (I1+I2) of zero to be seen by the current transformers 112 and 114. As long as the first and second conductors 134 and 136 are of the same size and type, there will be an equal load current (I1 and I2) in both of the first and second conductors 134 and 136, and no signal at the output of the current transformers 112, 114. In one embodiment, the first and second conductors 134 and 136 are run adjacent to each other, or side-by-side, in conduit, cable tray, or other routing means. In another embodiment, the first and second conductors 134 and 136 are run as a twisted-pair.

A loop current $I_{LOOP}$ is created using one of the current transformers 112 or 114 and detected by the other of the current transformers 112 or 114. Each current transformer 112, 114 can be used as a transmitting and a receiving transducer. The transmit-receive pair of current transformers 112, 114 and the loop 124 of wire consisting of first and second conductors, 134 and 136 respectively, constitute a communication link. This communications link is used to transmit alternating current signals, within the limits of the chosen current transformer 112, 114, that represent digital or analog information. Those skilled in the art will recognize that the communications signals may be encoded with a bi-phase scheme, amplitude modulation (AM), frequency modulation (FM), frequency shift keying (FSK), frequency hopping, spread spectrum techniques, or any number of other commonly used methods and techniques known in the communications field without departing from the spirit and scope of the present invention. Either full or half duplex and multiple channels can be implemented with this type of system.

Figure 2:
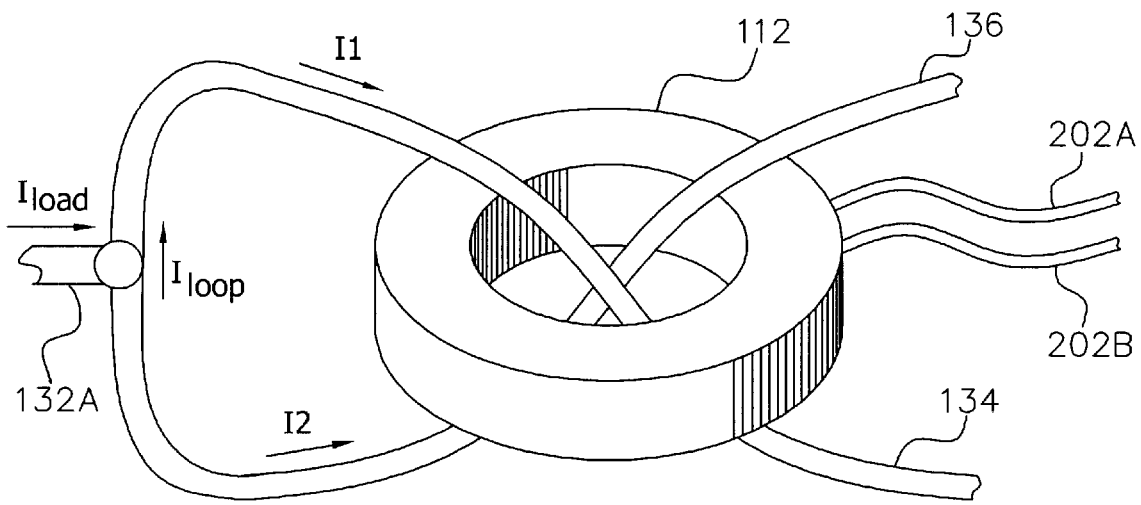
FIG. 2 is a perspective view of a current transformer used as a transducer.

FIG. 2 illustrates the direction of current flow in the first and second conductors 134 and 136 relative to the current transformer 112. The first and second conductors 134 and 136 cross in the center of the current transformer 112, with the load current I1 in first conductor 134 flowing in an opposite direction with respect to the load current I2 in the second conductor 136. The opposing load current flows cause the electromagnetic fields generated by the first and second conductors 134 and 136 to cancel each other. Accordingly, the secondary of the current transformer 112 has a zero output signal at the secondary wires 202a, 202b for the load current carried by the first and second conductors 134 and 136. A signal, in the form of the loop current $I_{LOOP}$, is induced onto the loop 124 by one of the current transformers 112 or 114 and sensed by the other current transformer 112 or 114, with the load currents I1 and I2 canceling each other out with respect to the current transformer 112, 114.

Figure 3:
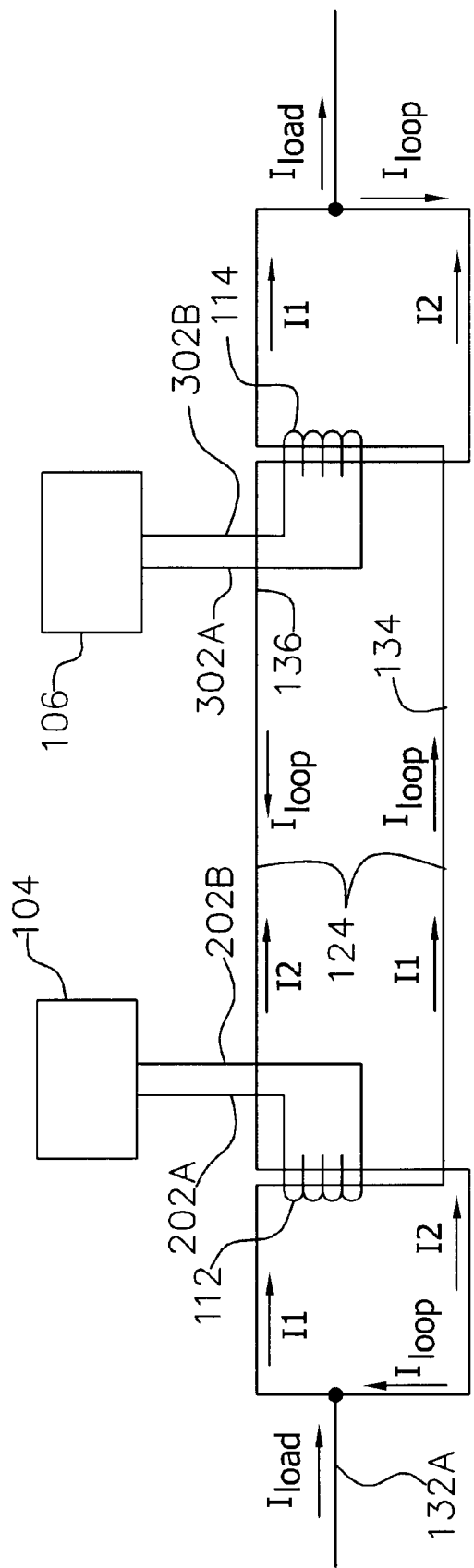
FIG. 3 is a schematic diagram of the power line communications system.

FIG. 3 illustrates a schematic diagram of the power line communications system 100. The power lead 132A is connected to first and second conductors 134, 136 of approximately the same size and type. The first and second conductors 134, 136 are wired in parallel and form the loop 124. Each of the first and second conductors 134, 136 carry approximately one-half of the total load current $I_{LOAD}$ flowing through the power lead 132A. The first and second conductors 134 and 136 are coupled to the current transformers 112 and 114. Current transformer 112 is connected to associated communications device 104 and current transformer 114 is connected to associated communications device 106. In one embodiment, the communications device 104 is a transmitter, and the communications device 106 is a receiver. In another embodiment, the communications device 104 is a transceiver, and the communications device 106 is a transceiver.

Figure 4:
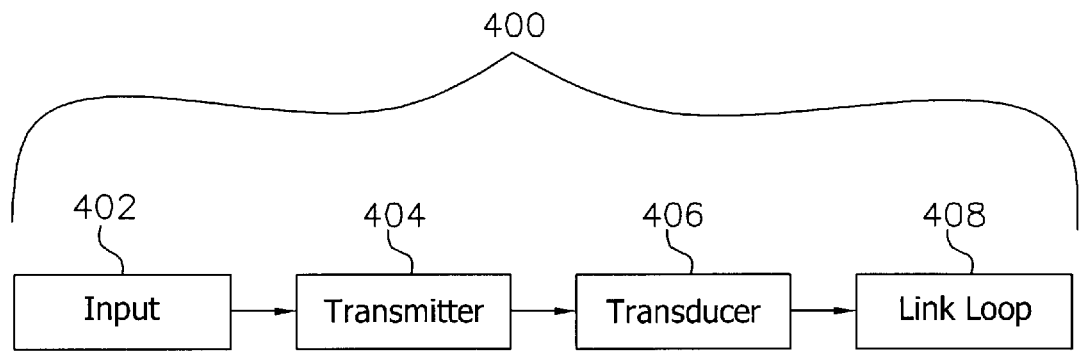
FIG. 4 is a simplified block diagram of a transmitter circuit.

FIG. 4 illustrates a simplified block diagram of a transmitter circuit 400. An input 402 feeds a transmitter 404, which is connected to a transducer 406, which induces a signal (loop current $I_{LOOP}$) on a loop 408. The input 402 can be a switch position, a digital signal, an analog signal, or other input. The transmitter 404 can be either a digital or analog circuit that is responsive to the input 402 and produces an output signal. The transducer 406 is responsive to the output signal from the transmitter 404. The transducer 406 induces the loop current $I_{LOOP}$ on the loop 408. Referring to FIG. 3, the current transformers 112, 114 are depicted as transducer 406, and the first and second conductors 134 and 136 are depicted as the loop 408.

Figure 5:
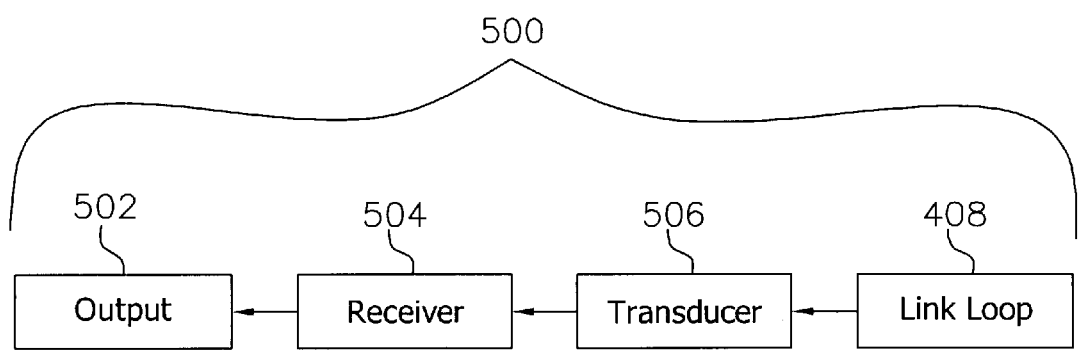
FIG. 5 is a simplified block diagram of a receiver circuit.

FIG. 5 illustrates a simplified block diagram of a receiver circuit 500. A transducer 506 senses a signal (loop current $I_{LOOP}$) on the loop 408 and produces a transducer output signal. The receiver 504 can be either a digital or analog circuit that is responsive to the transducer output signal and produces an output 502 which can be an indicating lamp, a digital signal, an analog signal, or other type of output. Referring to FIG. 3, the current transformers 112, 114 are depicted as transducer 506, and the first and second conductors 134, 136 are depicted as the loop 408.

Figure 6:
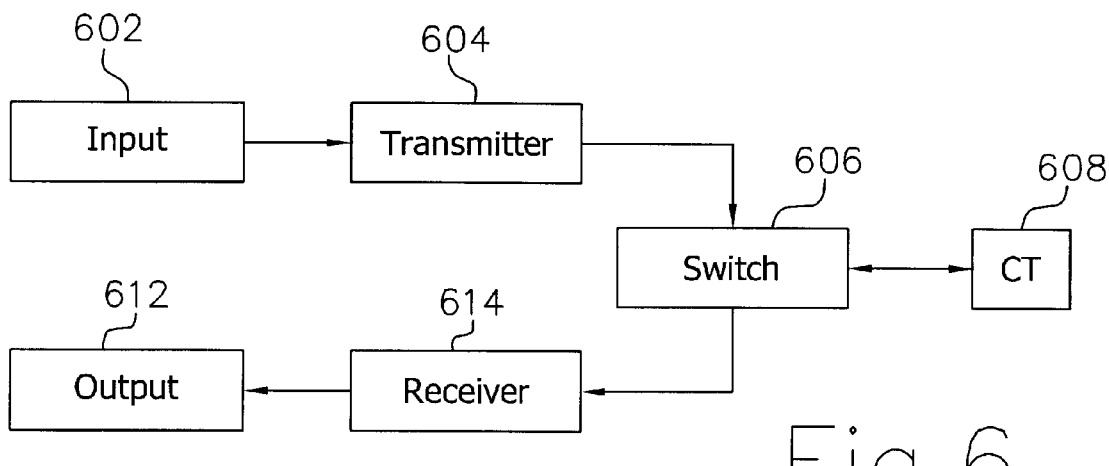
FIG. 6 is a block diagram of one embodiment of the power line communications system.

FIG. 6 shows a block diagram of one embodiment of a transceiver 104, 106 that uses a switch-606 and communicates in half-duplex mode. An input 602 feeds a transmitter 604, which outputs a signal to a switch 606, which, when in transmit mode, outputs the transmitter 604 signal to the current transformer or CT 608. The switch 606 communicates bidirectionally with the current transformer 608. The switch 606, when in receive mode, outputs the current transformer 608 signal to the receiver 614, which decodes the signal and produces an output 612. With this circuit, the transmitter 604 and receiver 614 alternate usage of the current transformer 608.

In operation, a master/slave protocol is used to prevent collisions on the half-duplex communication link established. Upon start up, the transceiver 104 is in slave mode. The switch 606 connects the current transformer 608 to the receiver 614, and the receiver 614 monitors the communication link and waits for a command from a second transceiver 106. After a preset period elapses without receiving a command, the transceiver 104 enters master mode and begins transmitting a command requesting data from a slave transceiver 106. When the second transceiver 106 starts up, it is in slave mode, waiting for a command from another transceiver 104. The second transceiver 106 receives the command from the first transceiver 104 and communications begin. Those skilled in the art will recognize that the master/slave protocol can be used with any power line communications system operating in half-duplex mode, and not just the transceiver 104 depicted in FIG. 6.

Figure 7:
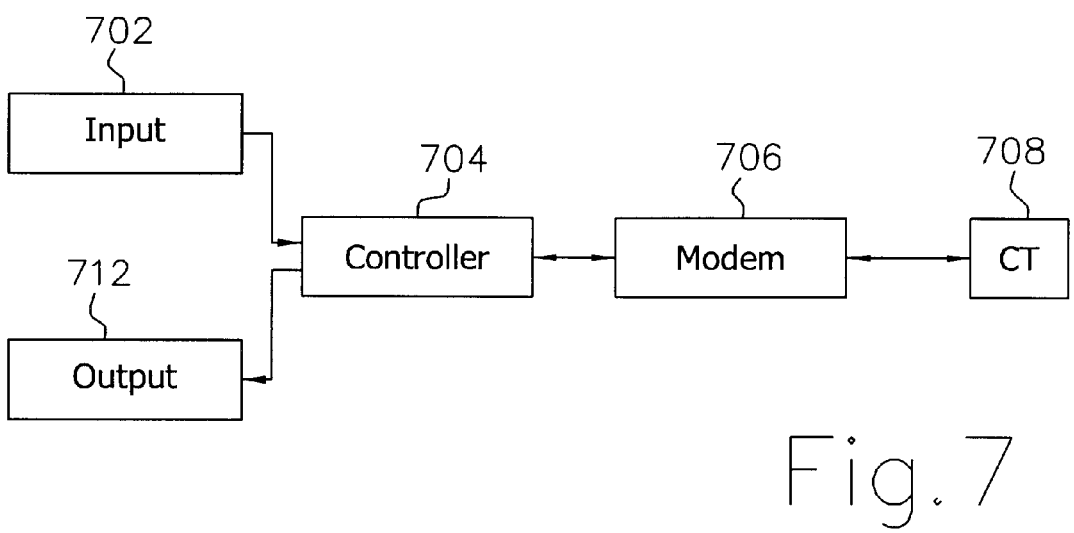
FIG. 7 is a block diagram of another embodiment of the power line communications system.

FIG. 7 shows a block diagram of another embodiment of a transceiver 104, 106 that can communicate in either half-duplex or full-duplex mode. An input 702 feeds a controller 704, which has an output 712. The controller 704 communicates bidirectionally with a modem 706. The modem 706 communicates with the current transformer 708. Those skilled in the art will recognize that the modem 706 and the controller 704 can be implemented using any of various components known in the art.

Those skilled in the art will recognize that the form or type of the signal used to communicate over the loop 124 can vary without departing from the spirit and scope of the present invention. In one embodiment, the signal sent to the current transformer 112, 114 is a digital signal consisting of a series of positive and negative pulses. In this embodiment, each data bit is immediately followed by its inverse, thereby guaranteeing that there will be an equal number of positive and negative pulses and that the current will be changing at a frequency that will generate a detectable signal at the receiving current transformer 112, 114. If the output remains in one state too long, the signal at the receiving current transformer 112, 114 would decay and cause errors.

The method of power line communications includes the steps of forming a loop from one of a plurality of power leads connecting two pieces of electrical equipment, inductively inducing a communications signal on that loop at a location near the first electrical equipment, and sensing the induced signal on the loop at a location near the second electrical equipment. Additionally, the method includes the steps of converting control and other signals into a communications signal and converting the communications signal into control and other signals.

From the forgoing description, it will be recognized by those skilled in the art that a power line communications system has been provided. At least one of a plurality of the power leads connecting two pieces of electrical equipment is split into two separate insulated conductors, thereby forming a loop. A pair of current transformers is inductively coupled to the loop by crossing the conductors as they pass through the center of each current transformer. One current transformer induces a signal on the loop and the other senses the induced signal. The induced signal carries a communication signal, which includes control and indication information, and audio, visual, or other types of communication. The transmission of the communications signal is performed without the use of cables or wiring other than the power line.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

We claim:

1. A power line communications system for communicating over a power line, said system comprising:
   a plurality of power leads for connecting a first electrical equipment with a second electrical equipment;
   a first conductor;
   a second conductor connected to said first conductor and forming a loop, said first conductor and said second conductor forming one of said plurality of power leads;
   a first current transformer inductively coupled to said loop, said first current transformer defining a first current transformer opening, said first conductor passing through said first current transformer opening, said second conductor passing through said first current transformer opening in an opposite direction with respect to said first conductor, said first current transformer inducing a loop current in said loop; and
   a second current transformer inductively coupled to said loop, said second current transformer defining a second current transformer opening, said first conductor passing through said second current transformer opening, said second conductor passing through said second current transformer opening in an opposite direction with respect to said first conductor, said second current transformer sensing said loop current in said loop.

2. The apparatus of claim 1 further comprising a transmitter in electrical communication with said first current transformer, said transmitter responsive to an input and generating a signal corresponding to said input.

3. The apparatus of claim 2 further comprising a receiver in electrical communication with said second current transformer and responsive to said loop current.

4. The apparatus of claim 1 wherein said first conductor carries a first load current and said second conductor carries a second load current, said first load current being substantially equal to said second load current, and said first load current being substantially in phase with said second load current.

5. The apparatus of claim 4 wherein said first conductor is routed adjacent to said second conductor.

6. The apparatus of claim 4 wherein said first conductor and said second conductor are routed as a twisted pair of conductors.

7. The apparatus of claim 1 wherein said loop is formed by electrically connecting said first conductor to said second conductor at said first equipment and by electrically connecting said first conductor to said second conductor at said second equipment.

8. The apparatus of claim 7 wherein said first current transformer is inductively coupled to said loop by passing said first conductor and said second conductor through said first current transformer opening in said first current transformer such that a first load current flowing in said first conductor opposes a second load current flowing in said second conductor.

9. The apparatus of claim 7 wherein said second current transformer is inductively coupled to said loop by passing said first conductor and said second conductor through said second current transformer opening in said second current transformer such that a first load current flowing in said first conductor opposes a second load current flowing in said second conductor.

10. A power line communications system for communicating over a power line connecting a first electrical equipment with a second electrical equipment, said system comprising:
a plurality of power leads connecting said first electrical equipment with said second electrical equipment;
a first conductor;
a second conductor connected to said first conductor and forming a loop, said first conductor and said second conductor forming one of said plurality of power leads,
a first current transformer inductively coupled to said loop to said loop by passing said first conductor and said second conductor through a first current transformer opening such that a first load current flowing in said first conductor opposes a second load current flowing in said second conductor; and
a second current transformer inductively coupled to said loop by passing said first conductor and said second conductor through a second current transformer opening such that said first load current flowing in said first conductor opposes said second load current flowing in said second conductor.

11. The apparatus of claim 10 further comprising
a first transceiver in electrical communication with said first current transformer; and
a second transceiver in electrical communication with said second current transformer.

12. The apparatus of claim 10 further comprising
a transmitter in electrical communication with said first current transformer and causing said first current transformer to induce a loop current in said loop; and
a receiver in electrical communication with said second current transformer and responsive to said loop current.

13. A power line communications system for communicating over a power line connecting a first electrical equipment with a second electrical equipment, said system comprising:
a means for splitting one of a plurality of power leads into a loop, said plurality of power leads connecting said first electrical equipment with said second electrical equipment, said loop extending from said first electrical equipment to said second electrical equipment;
a means for inducing a transmitted signal on said loop; and
a means for sensing said transmitted signal on said loop.

14. The system of claim 13 further comprising a means for transmitting an input and generating said transmitted signal.

15. The system of claim 13 further comprising a means for receiving said transmitted signal and generating an output.

16. A power line communications system for communicating over a power line, said system comprising:
a means for splitting one of a plurality of power leads into a loop, said loop extending from a first electrical equipment to a second electrical equipment;
a means for transmitting a signal over said loop; and
a means for receiving said signal on said loop.

17. A method of power line communications over a power line connecting a first electrical equipment with a second electrical equipment, said method comprising the steps of:
(a) forming a loop in one of a plurality of power leads, said plurality of power leads connecting said first electrical equipment and said second electrical equipment, said loop including a first conductor and a second conductor, said first and second conductors wired in parallel and each of said first and second conductors carrying substantially one-half of a load current;
(b) routing said first conductor through a first transformer opening in a first current transformer;
(c) routing said second conductor through said first transformer opening such that said one-half of said load current flows in an opposite direction relative to said first conductor;
(d) inducing a communications signal on said loop by exciting a first transformer secondary winding of said first current transformer; and
(e) sensing said communications signal on said loop with a second current transformer.

18. The method of claim 17 further comprising the step of converting an input into said communications signal.

19. The method of claim 17 further comprising the step of converting said sensed communication signal into an output.

20. A method of power line communications over a power line, said method comprising the steps of:
(a) forming a loop in at least one of a plurality of power leads, said plurality of power leads for connecting a first electrical equipment to a second electrical equipment, said loop including a first conductor and a second conductor, said first and second conductors wired in parallel;
(b) routing said first conductor through a first transformer opening in a first current transformer;
(c) routing said second conductor through said first transformer opening such that said one-half of said load current flows in an opposite direction relative to said first conductor;
(d) converting an input into a communications signal;
(e) inductively inducing said communications signal on said loop by exciting a first transformer secondary winding of said first current transformer;
(f) sensing said communications signal on said loop with a second current transformer; and
(g) converting said sensed communication signal into an output.

21. A method of power line communications over a power line connecting a first electrical equipment with a second electrical equipment, said method comprising the steps of:

(a) forming a loop in an insulated ground lead connecting said first electrical equipment and said second electrical equipment, said insulated ground lead including a first conductor and a second conductor, said first and second conductors wired in parallel;

(b) routing said first conductor through a first transformer opening in a first current transformer;

(c) routing said second conductor through said first transformer opening such that said one-half of said load current flows in an opposite direction relative to said first conductor;

(d) converting an input into a communications signal;

(e) inductively inducing said communications signal on said loop by exciting a first transformer secondary winding of said first current transformer;

(f) sensing said communications signal on said loop with a second current transformer; and (g) converting said sensed communication signal into an output.

* * * * *